United States Patent
He

(10) Patent No.: US 12,122,337 B2
(45) Date of Patent: Oct. 22, 2024

(54) HYDRAULIC CONTROL UNIT FOR VEHICLE BRAKE SYSTEM

(71) Applicant: Robert Bosch GmbH, Stuttgart (DE)

(72) Inventor: Ji He, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 17/298,139

(22) PCT Filed: Nov. 18, 2019

(86) PCT No.: PCT/IB2019/059870
§ 371 (c)(1),
(2) Date: May 28, 2021

(87) PCT Pub. No.: WO2020/109919
PCT Pub. Date: Jun. 4, 2020

(65) Prior Publication Data
US 2022/0017058 A1 Jan. 20, 2022

(30) Foreign Application Priority Data

Nov. 29, 2018 (JP) .................................. 2018-223055

(51) Int. Cl.
*B60T 15/36* (2006.01)
*B60T 11/10* (2006.01)
(Continued)

(52) U.S. Cl.
CPC ............. *B60T 15/36* (2013.01); *B60T 11/103* (2013.01); *B60T 13/145* (2013.01); *B60T 15/028* (2013.01)

(58) Field of Classification Search
CPC ........ B60T 8/4068; B60T 8/367; B60T 8/363; B60T 8/4291; B60T 8/1872; B60T 13/145; B60T 15/36; B60T 15/028; B60T 8/103
See application file for complete search history.

(56) References Cited

U.S. PATENT DOCUMENTS 5,853,229 A 12/1998 Willmann et al.
5,879,060 A * 3/1999 Megerle ................ B60T 8/5025
303/119.2
(Continued)

FOREIGN PATENT DOCUMENTS

CN 102446613 A 5/2012
DE 102009055172 A1 * 6/2011 ............ B60T 13/662
(Continued)

OTHER PUBLICATIONS

International Search Report and Written Opinion for Application No. PCT/IB2019/059870 dated Feb. 12, 2020 (12 pages).

*Primary Examiner* — Pamela Rodriguez
(74) *Attorney, Agent, or Firm* — Michael Best & Friedrich LLP

(57) ABSTRACT

Examples relate to a hydraulic control unit that includes a pump for increasing a hydraulic pressure of a brake fluid. The hydraulic control unit includes a discharge channel from which the brake fluid pressurized by a pump is discharged, a pulsation reducing unit disposed in the middle of the discharge channel, and a controller controlling the pump and the pulsation reducing unit. The pulsation reducing unit includes a valve housing, a fixed core fixed to the valve housing, a movable core received in the valve housing in an axially movable manner, a closing member interlocking with the movable core and closing the discharge channel, a coil disposed in a manner to surround the valve housing and the fixed core, and an inflow chamber formed by the valve housing and one end surface of the movable core, into which the brake fluid flows, and whose volume can vary.

7 Claims, 4 Drawing Sheets

(51) Int. Cl.
*B60T 13/14* (2006.01)
*B60T 15/02* (2006.01)

(56) References Cited

U.S. PATENT DOCUMENTS

| | | | |
|---|---|---|---|
| 6,056,373 A * | 5/2000 | Zechmann | B60T 8/4872 |
| | | | 303/3 |
| 6,837,478 B1 * | 1/2005 | Goossens | H01F 7/13 |
| | | | 251/337 |
| 2003/0209940 A1 | 11/2003 | Inage et al. | |
| 2011/0147625 A1 * | 6/2011 | Speer | B60T 8/363 |
| | | | 29/890.12 |
| 2011/0147628 A1 * | 6/2011 | Kurz | B60T 8/363 |
| | | | 251/129.15 |
| 2011/0204271 A1 * | 8/2011 | Kratzer | B60T 8/363 |
| | | | 251/129.15 |
| 2012/0012765 A1 * | 1/2012 | Alaze | F16K 31/0689 |
| | | | 251/65 |
| 2012/0080624 A1 | 4/2012 | Stahr et al. | |
| 2012/0313022 A1 * | 12/2012 | Godbillon | F16K 31/0665 |
| | | | 251/129.15 |
| 2013/0020514 A1 * | 1/2013 | Watanabe | B60T 8/363 |
| | | | 251/129.15 |
| 2013/0200687 A1 * | 8/2013 | Guo | B60T 8/4291 |
| | | | 303/87 |

FOREIGN PATENT DOCUMENTS

| | | |
|---|---|---|
| JP | 2001055129 A | 2/2001 |
| JP | 2017537020 A | 12/2017 |

* cited by examiner

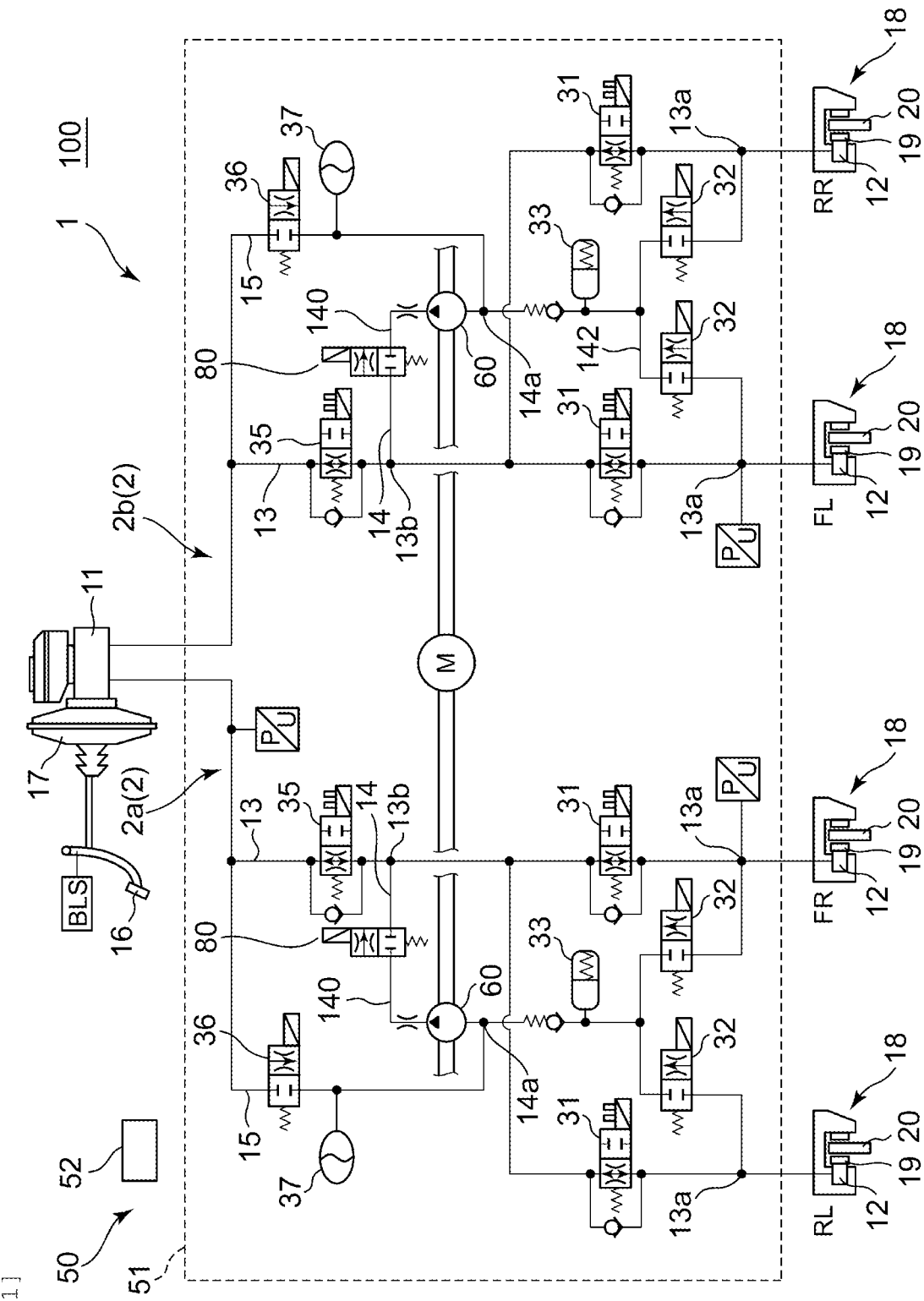
[FIG. 1]

[FIG. 2]
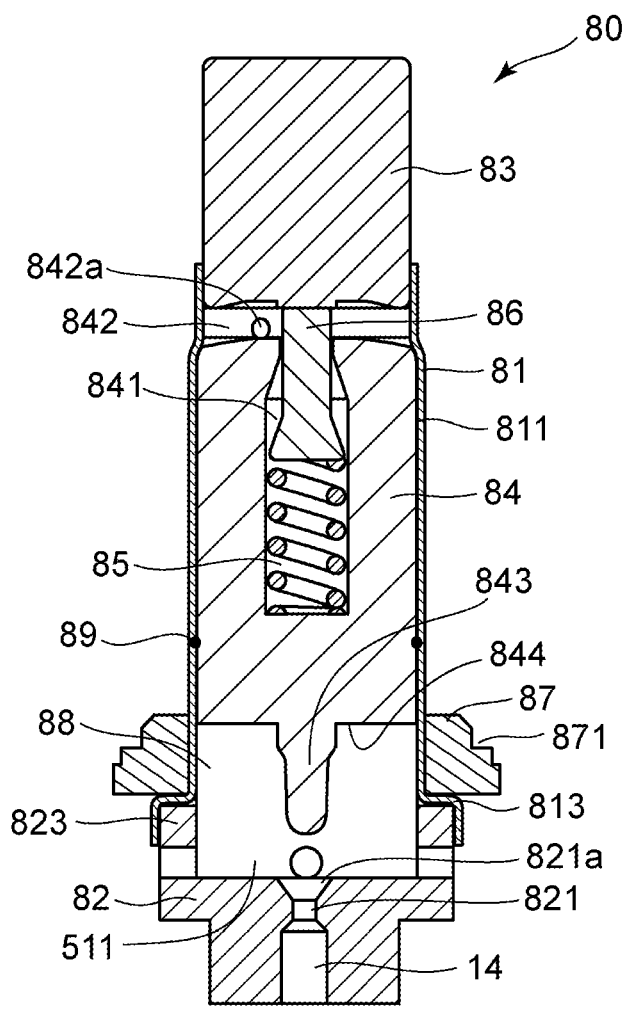

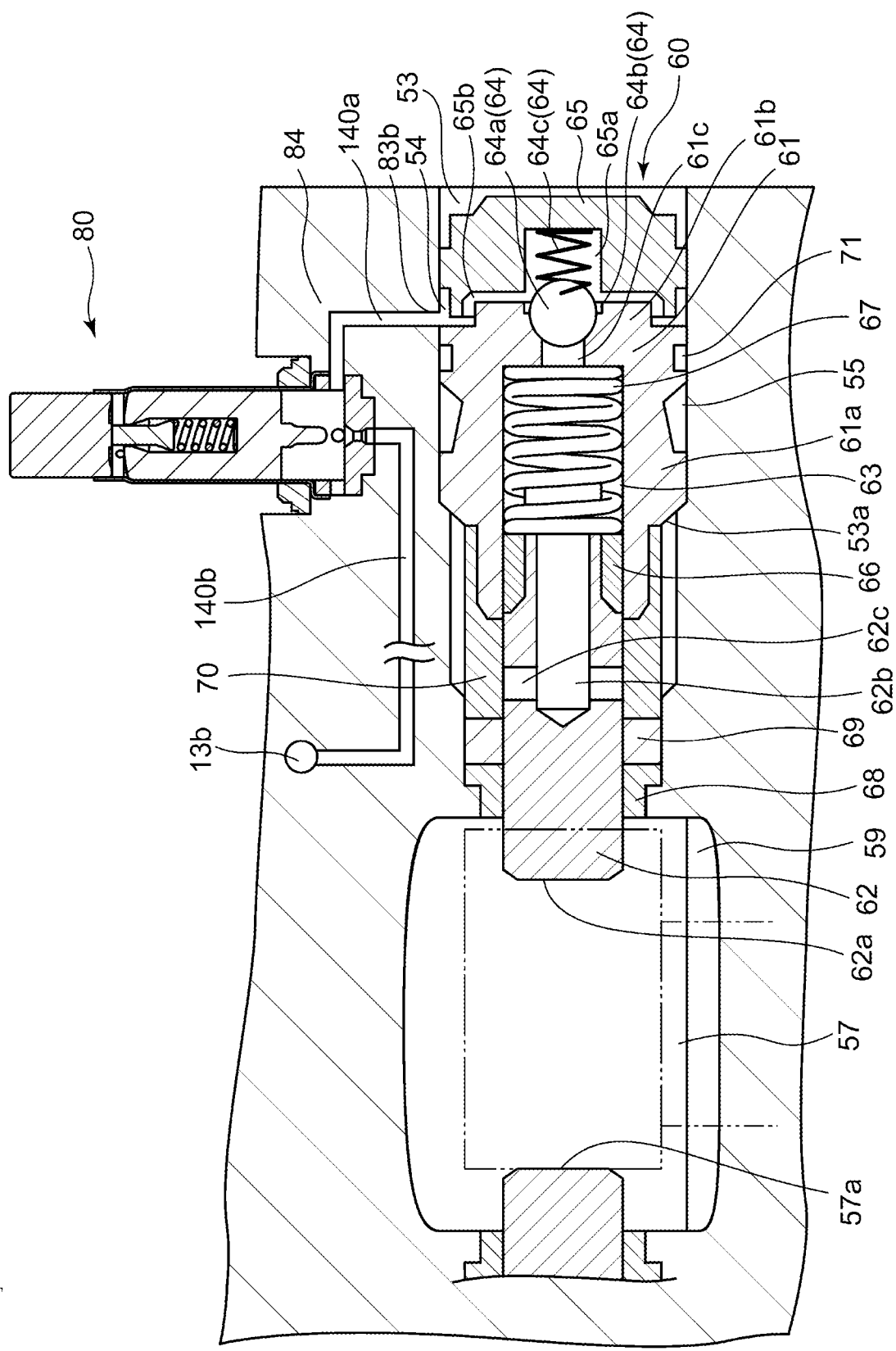
[FIG. 3]

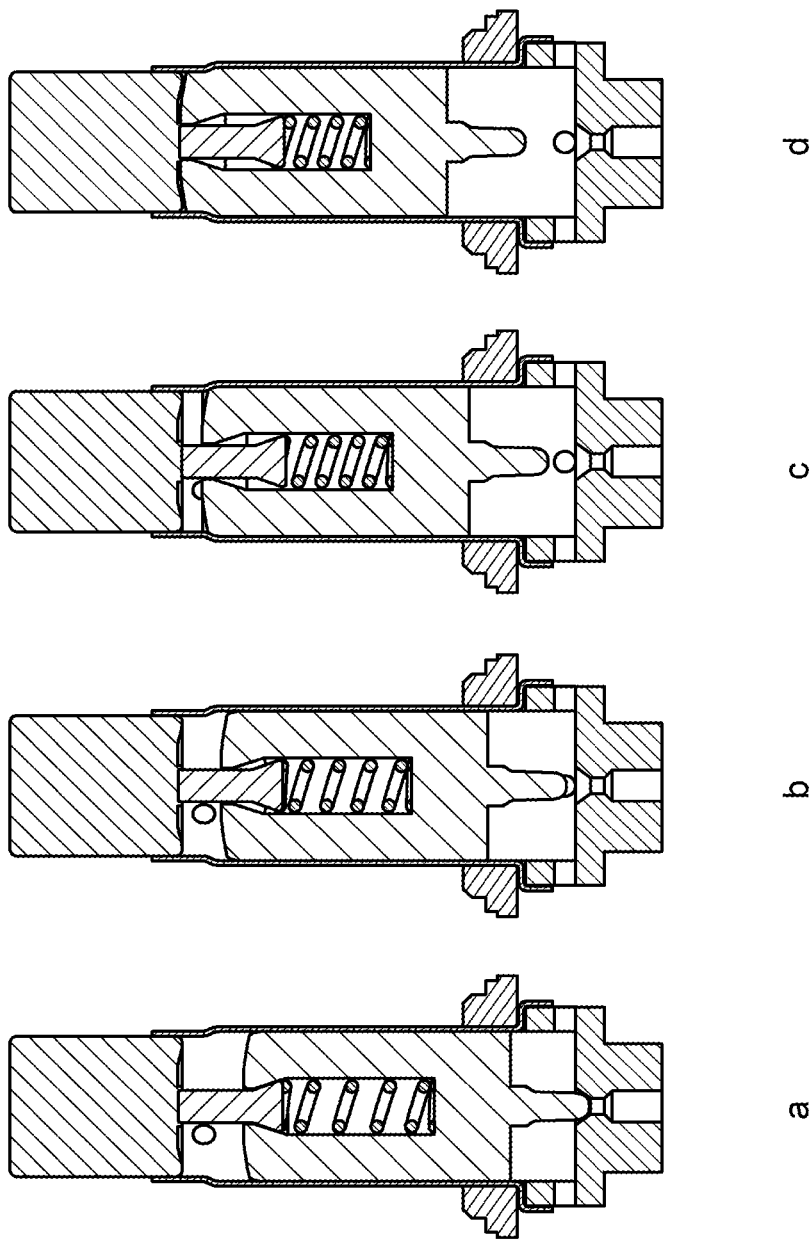
[FIG. 4]

HYDRAULIC CONTROL UNIT FOR VEHICLE BRAKE SYSTEM

BACKGROUND OF THE INVENTION

The present invention relates to a hydraulic control unit for a vehicle brake system and, in particular, to a hydraulic control unit for a brake system that includes a pump used to increase a hydraulic pressure of a brake fluid.

As a conventional vehicle brake system that has been available, a vehicle brake system includes a hydraulic circuit having: a primary channel that communicates between a master cylinder and a wheel cylinder; a secondary channel through which a brake fluid in the primary channel is released; and a supply channel through which the brake fluid is supplied to an intermediate portion of the secondary channel.

For example, in the secondary channel, an upstream end in a flow of the brake fluid is connected to a region on the wheel cylinder side in the primary channel with an inlet valve being a reference. A downstream end of the secondary channel is connected to a region on the master cylinder side in the primary channel with the inlet valve being the reference. In addition, in the supply channel, an upstream end in the flow of the brake fluid communicates with the master cylinder. A downstream end of the supply channel is connected to a region on a downstream side in the secondary channel with an outlet valve being a reference, and is also connected to a suction side of a pump that is provided in the region. Furthermore, a first switching valve is provided in the region on the master cylinder side in the primary channel with a connected portion of the primary channel with the downstream end of the secondary channel being a reference. A second switching valve is provided in an intermediate portion of the supply channel.

For example, a hydraulic control unit is configured by including the inlet valve, the outlet valve, the pump, the first switching valve, the second switching valve, a housing in which these components are embedded, and a controller that governs operation of these components. In the hydraulic control unit, a hydraulic pressure in a hydraulic circuit is controlled when the operation of each of the inlet valve, the outlet valve, the pump, the first switching valve, and the second switching valve is controlled.

In particular, in the case where it is necessary to increase the hydraulic pressure of the brake fluid in the wheel cylinder regardless of a brake operation state in an input section (for example, a brake pedal or the like) of the brake system, the pump is driven in a state where the inlet valve is opened, the outlet valve is closed, the first switching valve is closed, and the second switching valve is opened.

When the pump is driven, pulsation that is generated in the brake fluid is possibly transmitted from the brake system to an engine room in a vehicle and possibly causes generation of noise. This noise occasionally becomes so loud that a user (a driver) receives a sense of discomfort. For this reason, the conventional hydraulic control unit for the brake system that is designed to reduce the pulsation generated during driving of the pump has been proposed. For example, a hydraulic control unit for a brake system disclosed in JP-T-2017-537020 includes a pump in each hydraulic circuit and also includes a pulsation reducing unit on a discharge side of the pump. The pulsation reducing unit reduces the pulsation of the brake fluid that is discharged from the pump.

SUMMARY OF THE INVENTION

The pulsation reducing unit disclosed in JP-T-2017-537020 reduces the pulsation by once absorbing the pulsation of the brake fluid discharged from the pump by a suppressing element that has a tubular shape and can elastically be deformed. However, the brake fluid that has flowed into the suppressing element does not contribute to the increase in the hydraulic pressure of the wheel cylinder for braking the vehicle. Thus, a vehicle braking force that is generated by automatically pressurizing the brake fluid using the pump is weakened. This leads to loss of the braking force when it is desired to urgently brake the vehicle in order to avoid an imminent collision. Therefore, improvement is requested.

The present invention has been made in view of the above-described problem as the background, and therefore has a purpose of providing a brake system that includes a pulsation reducing unit capable of adjusting a braking force to be exerted on a vehicle and a pulsation reducing degree of a brake fluid with pulsation according to a braking mode of the vehicle and a requested braking force.

Solution to Problem

A hydraulic control unit according to the present invention is a hydraulic control unit for a vehicle brake system, and includes: a discharge channel from which a brake fluid is discharged, the brake fluid being pressurized by a pump; a pulsation reducing unit disposed in the middle of the discharge channel; and a controller that controls the pump and the pulsation reducing unit. The pulsation reducing unit includes: a valve housing; a fixed core fixed to the valve housing; a movable core received in the valve housing in an axially movable manner; a closing member that interlocks with the movable core and closes the discharge channel; a coil disposed in a manner to surround the valve housing and the fixed core; and an inflow chamber which is formed by the valve housing and one end surface of the movable core, into which the brake fluid from the discharge channel flows, and whose volume can vary.

Advantageous Effects of Invention

The brake system according to the present invention has a configuration of actively vary the volume of the inflow chamber, into which the brake fluid with pulsation flows, instead of passively vary the volume thereof according to a pressure of the inflow brake fluid. Thus, it is possible to adjust a braking force to be exerted on the vehicle and a pulsation reducing degree of the brake fluid with the pulsation according to a brake mode of the vehicle.

BRIEF DESCRIPTION OF THE DRAWINGS

FIG. 1 is a diagram of an exemplary configuration of a brake system according to an embodiment of the present invention.

FIG. 2 is a cross-sectional view of an example of a pulsation reducing unit in a hydraulic control unit for the brake system according to the embodiment of the present invention.

FIG. 3 is a view of an example in which the pulsation reducing unit and a pump are mounted on a housing in the hydraulic control unit for the brake system according to the embodiment of the present invention.

FIG. 4 includes views of examples of the pulsation reducing unit in the hydraulic control unit for the brake system according to the embodiment of the present invention.

DETAILED DESCRIPTION

A description will hereinafter be made on a hydraulic control unit according to the present invention with reference to the drawings.

Note that the following description will be made on a case where a brake system that includes the hydraulic control unit according to the present invention is mounted on a four-wheeled vehicle; however, the brake system that includes the hydraulic control unit according to the present invention may be mounted on a vehicle (a motorcycle, a truck, a bus, or the like) other than the four-wheeled vehicle. A configuration, operation, and the like, which will be described below, constitute merely one example, and the brake system that includes the hydraulic control unit according to the present invention is not limited to a case with such a configuration, such operation, and the like. In the drawings, the same or similar members or portions will be denoted by the same reference sign or will not be denoted by a reference sign. A detailed structure will appropriately be illustrated in a simplified manner or will not be illustrated.

<Configuration and Operation of Brake System 1>

A description will be made on a configuration and operation of a brake system 1 according to this embodiment.

FIG. 1 is a diagram of an exemplary system configuration of the brake system according to the embodiment of the present invention.

As illustrated in FIG. 1, the brake system 1 is mounted on a vehicle 100 and includes a hydraulic circuit 2. The hydraulic circuit 2 has: a primary channel 13 that communicates between a master cylinder 11 and a wheel cylinder 12; a secondary channel 14 through which a brake fluid in the primary channel 13 is released; and a supply channel 15 through which the brake fluid is supplied to the secondary channel 14. The hydraulic circuit 2 is filled with the brake fluid. Note that the brake system 1 according to this embodiment includes two hydraulic circuits 2a, 2b as the hydraulic circuits 2. The hydraulic circuit 2a is a hydraulic circuit that communicates between the master cylinder 11 and the wheel cylinder 12 in each of wheels RL, FR through the primary channel 13. The hydraulic circuit 2b is a hydraulic circuit that communicates between the master cylinder 11 and the wheel cylinder 12 in each of wheels FL, RR through the primary channel 13. These hydraulic circuits 2a, 2b have the same configuration except that the communicated wheel cylinders 12 differ.

A piston (not illustrated) is installed in the master cylinder 11, and the piston reciprocates in an interlocking manner with a brake pedal 16 as an example of an input section of the brake system 1. A booster 17 is interposed between the brake pedal 16 and the piston in the master cylinder 11, and a depression force generated by a user is boosted and transmitted to the piston. The wheel cylinder 12 is provided in a brake caliper 18. When a hydraulic pressure of the brake fluid in the wheel cylinder 12 is increased, a brake pad 19 of the brake caliper 18 is pressed against a rotor 20, and the wheel is thereby braked.

An upstream end of the secondary channel 14 is connected to an intermediate section 13a of the primary channel 13, and a downstream end of the secondary channel 14 is connected to an intermediate section 13b of the primary channel 13. An upstream end of the supply channel 15 communicates with the master cylinder 11, and a downstream end of the supply channel 15 is connected to an intermediate section 14a of the secondary channel 14.

Note that the upstream side in the secondary channel 14 means an upstream side of a flow of the brake fluid at the time when a pump is driven and the brake fluid circulates from the wheel cylinder to the master cylinder, and a downstream side therein means a downstream side in the flow of the brake fluid at the same time.

An inlet valve (EV) 31 is provided in a region between the intermediate section 13b and the intermediate section 13a in the primary channel 13 (a region on the wheel cylinder 12 side with the intermediate section 13b being a reference). An outlet valve (AV) 32 is provided in a region between the upstream end and the intermediate section 14a in the secondary channel 14. An accumulator 33 is provided in a region between the outlet valve 32 and the intermediate section 14a in the secondary channel 14. The inlet valve 31 is an electromagnetic valve that is opened in an unenergized state and closed in an energized state, for example. The outlet valve 32 is an electromagnetic valve that is closed in an unenergized state and opened in an energized state, for example.

A pump 60 is provided in a region between the intermediate section 14a and the downstream end in the secondary channel 14. A suction side of the pump 60 communicates with the intermediate section 14a. A discharge side of the pump 60 communicates with the downstream end of the secondary channel 14. In detail, the brake system 1 includes a suction channel 142 and a discharge channel 140 as parts of the secondary channel 14 as a configuration of a hydraulic control unit 50. The suction channel 142 constitutes a channel between the upstream end of the secondary channel 14 and the suction side of the pump 60, and the discharge channel 140 constitutes a channel between the discharge side of the pump 60 and the downstream end of the secondary channel 14.

Here, the hydraulic control unit 50 includes a pulsation reducing unit 80 in the discharge channel 140, and the pulsation reducing unit 80 dampens pulsation of the brake fluid discharged from the pump 60. Similar to the other valves (31, 32, 35, 36), the pulsation reducing unit 80 may be attached to one side surface of a housing 51. The pulsation reducing unit 80 has a similar structure to the electromagnetic valve, and is a valve that is closed in an unenergized state and opened in the energized state.

A first switching valve (USV) 35 is provided in a region on the master cylinder 11 side in the primary channel 13 with the intermediate section 13b being the reference. The supply channel 15 is provided with a second switching valve (HSV) 36 and a damper unit 37. The damper unit 37 is provided in a region between the second switching valve 36 and the downstream end of the supply channel 15. The first switching valve 35 is an electromagnetic valve that is opened in an unenergized state and closed in an energized state, for example. The second switching valve 36 is an electromagnetic valve that is closed in an unenergized state and opened in an energized state, for example. Note that the damper unit 37 can be operated regardless of an attachment space and a requested pulsation dampening characteristic.

The hydraulic control unit 50 is configured by at least including the housing 51, the members provided in the housing 51, and a controller (ECU) 52. In the hydraulic control unit 50, when the controller 52 controls operation of each of the inlet valve 31, the outlet valve 32, the pump 60, the first switching valve 35, the second switching valve 36, and the pulsation reducing unit 80, the hydraulic pressure of the brake fluid in the wheel cylinder 12 is controlled. That is, the controller 52 governs the operation of each of the inlet valve 31, the outlet valve 32, the pump 60, the first switching valve 35, the second switching valve 36, and the pulsation reducing unit 80.

The controller 52 may be provided as one unit or may be divided into multiple units. In addition, the controller 52 may be attached to the housing 51 or may be attached to another member. Furthermore, the controller 52 may partially or entirely be constructed of a microcomputer, a microprocessor unit, or the like, may be constructed of a member in which firmware and the like can be updated, or may be a program module or the like that is executed by a command from a CPU or the like, for example.

The controller 52 performs the following hydraulic control operation in addition to well-known hydraulic control operations (ABS control operation, ESP control operation, or the like), for example.

In the case where shortage or possible shortage of the hydraulic pressure in the hydraulic circuit 2 is detected from a detection signal of a position sensor for the brake pedal 16 and a detection signal of a hydraulic pressure sensor for the hydraulic circuit 2 when the brake pedal 16 of the vehicle 100 is operated in a state where the inlet valve 31 is opened, the outlet valve 32 is closed, the first switching valve 35 is opened, the second switching valve 36 is closed, and the pulsation reducing unit 80 is closed, the controller 52 initiates active pressure build-up control operation.

In the active pressure build-up control operation, the controller 52 maintains the inlet valve 31 in an open state and thereby allows a flow of the brake fluid from the intermediate section 13b of the primary channel 13 to the wheel cylinder 12. In addition, the controller 52 maintains the outlet valve 32 in a closed state and thereby restricts a flow of the brake fluid from the wheel cylinder 12 to the accumulator 33. Furthermore, the controller 52 closes the first switching valve 35 and thereby restricts a flow of the brake fluid in the channel from the master cylinder 11 to the intermediate section 13b of the primary channel 13 without interposing the pump 60. Moreover, the controller 52 opens the second switching valve 36 and the valve in the pulsation reducing unit 80, and thereby allows a flow of the brake fluid in the channel from the master cylinder 11 to the intermediate section 13b of the primary channel 13 via the pump 60. Then, the controller 52 drives the pump 60 so as to increase (build up) the hydraulic pressure of the brake fluid in the wheel cylinder 12.

When it is detected that the shortage of the hydraulic pressure in the hydraulic circuit 2 is resolved or avoided, the controller 52 opens the first switching valve 35, closes the second switching valve 36, closes the pulsation reducing unit 80, and stops driving the pump 60, so as to terminate the active pressure build-up control operation.

At this time, when the pump 60 is driven, the pulsation, which is generated in the brake fluid, is occasionally transmitted to the wheel cylinder 12 through the secondary channel 14 and the primary channel 13. Then, such pulsation is transmitted to an engine room that accommodates the hydraulic control unit 50 for the brake system 1, and occasionally generates noise. This noise occasionally becomes so loud that the user (a driver) receives a sense of discomfort. Thus, it is important to reduce the pulsation that is generated during driving of the pump 60.

In view of the above, in the brake system 1 according to this embodiment, the pulsation reducing unit 80 is opened at the same time as driving of the pump 60. As a result, the brake fluid that is discharged from the pump 60 flows into an inflow chamber 88 of the pulsation reducing unit 80. Then, after the pulsation of the brake fluid that has flowed into the inflow chamber 88 is dampened in the inflow chamber 88, such brake fluid flows to the downstream side. Thus, the brake system 1 according to this embodiment, that is, the hydraulic control unit 50 can reduce the pulsation that is generated during driving of the pump 60.

Note that, in the above-described active pressure build-up control, the pump 60 is driven in a state where the user operates (depresses) the brake pedal 16 and the second switching valve 36 is opened. Accordingly, the pulsation, which is generated in the brake fluid, is transferred to the brake pedal 16 via the supply channel 15 and the master cylinder 11 and gives the sense of discomfort to the user. Thus, as illustrated in FIG. 1, the brake system 1 according to this embodiment, that is, the hydraulic control unit 50 preferably includes the damper unit 37. It is because the damper unit 37 can dampen the pulsation of the brake fluid that is transferred from the pump 60 to the brake pedal 16.

In the case where the damper unit 37 is provided in the brake system 1 that does not include the booster 17, the damper unit 37 may be provided in a region between the upstream end and the second switching valve 36 in the supply channel 15. Due to provision of the damper unit 37 at such a position, the brake fluid can flow into the damper unit 37 when the user depresses the brake pedal 16, and a reaction force of the brake fluid in the hydraulic circuit 2, which is transmitted to the brake pedal 16, is reduced. Thus, when the user depresses the brake pedal 16, it is possible to obtain the same amount of the depression force of the brake pedal 16 as that in the brake system 1 including the booster 17. Therefore, when using the brake system 1 that does not include the booster 17, the user can have the same feeling as using the brake system 1 that includes the booster 17.

<Configuration of Pulsation Reducing Unit>

A description will be made on an exemplary configuration of the pulsation reducing unit 80 in the brake system 1 according to this embodiment. As illustrated in FIG. 2, the pulsation reducing unit 80 that has a similar configuration to the electromagnetic valve of a constantly-closed type primarily includes: a cylindrical valve housing 81; a valve seat section 82 that is mounted on the inside on a lower end side of this valve housing 81; a fixed core 83 that is fixed to the inside on an upper end side of the valve housing 81; a movable core 84 that is mounted on the inside of the valve housing 81 in a slidable manner between the valve seat section 82 and the fixed core 83; and a fixed bush 87 that is annularly mounted on an outer circumference of the valve housing 81. The movable core 84 is made from a magnetic material. When an electromagnetic coil (not illustrated) that is annularly mounted around the fixed core 83 is excited, the movable core 84 is attracted to the fixed core 83 and moves to the upper end side. At a position between the fixed core 83 and the movable core 84, a valve spring 85 that urges the movable core 84 to the valve seat section 82 side is mounted in a compressed state on the inside of a cavity section 841 provided in the movable core 84. The valve spring 85 is constructed of a coil spring. The inflow chamber 88, into which the brake fluid flows, is formed to include: a bottomed hole 511 provided in the housing 51; a sliding section 811 of the valve housing 81 where the movable core 84 slides; the valve housing 81; and a lower surface 844 of the movable core 84. In addition, a pressing section 86 that presses a return spring is attached to the fixed core 83 in a manner to enter the cavity section 841 provided in the movable core 84 and extend downward from a lower surface of the fixed core 83. When the pressing section 86 is configured just as described, a movable range (a stroke) of the movable core 84 can be increased, and thus a volume of the inflow chamber 88, into which the brake fluid flows, can be increased. Furthermore, an air chamber 842 whose volume is increased as the movable core 84 slides downward is formed by the lower surface of the fixed core 83, the sliding section 811 of the valve housing 81, and an upper surface of the movable core 84. The valve housing 81 is formed with an air chamber hole 842*a* through which the air chamber 842 communicates with ambient air. In this way, regardless of a change in the volume of the air chamber 842 caused by the movement of the movable core 84, an air pressure in the air chamber 842 can be kept constant, and the movable core 84 can slide smoothly.

In a state where the electromagnetic coil (not illustrated) that is mounted around the fixed core 83 is demagnetized, the movable core 84 is urged to a lower side by the valve seat section 82 side. In this way, an opening 821 formed in the valve seat section 82 is closed, and consequently, the discharge channel 140 formed in the housing 51 is brought into a blocked state. Then, when the electromagnetic coil (not illustrated) is excited, the movable core 84 is attracted and moves to the fixed core 83 side against an urging force of the valve spring 85, and thereby separates from the valve seat section 82. Thus, the opening 821, which is formed in the valve seat section 82, is opened. As a result, the discharge channel 140 formed in the housing 51 is brought into a communicating state.

The valve housing 81 is made from a non-magnetic material such as stainless steel, and has: the sliding section 811 where the movable core 84 slides; and a step section 813 that is formed in a manner to continue from a lower side of this sliding section 811.

The sliding section 811 is formed such that an inner diameter thereof is equal to an outer diameter of the movable core 84. The fixed core 83 is fixed to a portion near an upper end of the sliding section 811 by laser welding or the like.

A seal ring 89 is provided between the valve housing 81 and the movable core 84 so as to prevent the brake fluid that has flowed into the inflow chamber 88 from flowing into the air chamber 842 along a sliding surface of the movable core 84.

The opening 821 is formed on a lower end side of the valve seat section 82, which is formed in the housing 51, and is configured to communicate with one of the discharge channels 140 via the inflow chamber 88. The opening 821 in the valve seat section 82 is formed with a tapered section 821*a* whose diameter is gradually increased toward an upper end side. When a closing member 843 that is projected from a surface of the movable core 84 on the inflow chamber 88 side abuts this tapered section 821*a*, the opening 821 is closed.

As illustrated in FIG. 2, in an outer circumferential section on the upper end side of the valve seat section 82, an abutment section 823 that abuts an inner surface of the step section 813 of the valve housing 81 is formed in a manner to extend to the upper end side and radially outward. An upper end surface of the abutment section 823 is formed in parallel with the step section 813 in a manner to abut along the inner surface (a lower surface) of the step section 813.

The cylindrical fixed bush 87 is annularly mounted on an outer circumferential section of the valve housing 81. The fixed bush 87 is arranged such that a lower end thereof abuts the step section 813 of the valve housing 81. The fixed bush 87 is formed to have such an axial length that an upstream end of the fixed bush 87 is substantially flush with a surface of the housing 51 when the pulsation reducing unit 80 is inserted in an attachment hole.

A circumferential edge on the inside of the attachment hole in the housing 51 is plastically flowed into a groove section 871 of the fixed bush 87, so as to form a plastically deformed section. In this way, the pulsation reducing unit 80 is configured to be caulked to the housing 51. At this time, the fixed bush 87 is pressed to a radially center side by the plastic flow of the housing 51.

The fixed bush 87 is constructed of a member having a certain degree of strength, for example, and is configured to be deformed in a manner to reduce the diameter thereof and be pressed against an outer circumferential surface of the sliding section 811 of the valve housing 81 when being pressed to the radially center side by the plastic flow of the housing 51. Just as described, in this embodiment in which the fixed bush 87 is deformed in the manner to reduce the diameter thereof at the time of caulking, it is possible to configure that an inner diameter of the fixed bush 87 before the deformation to reduce the diameter is slightly larger than an outer diameter of the sliding section 811.

An upper surface of the step section 813 of the valve housing 81 is pressed against the fixed bush 87, and the lower surface thereof abuts the valve seat section 82 that is fixed to the abutment section 823 of the attachment hole. That is, the step section 813 is held between the fixed bush 87 and the valve seat section 82.

Note that the electromagnetic coil, which is not illustrated, is assembled to a coil housing (not illustrated), and is annularly mounted on the fixed core 83 when the coil housing is attached to the housing 51.

The pulsation reducing unit 80 that is configured as described so far is opened when the electromagnetic coil is excited, and is closed when the electromagnetic coil is demagnetized. More specifically, when the electromagnetic coil is excited on the basis of a command from the controller 52, the movable core 84 is attracted to the fixed core 83 and moves to the upper end side, and the lower end thereof (the closing member 843) separates from the opening 821 of the valve seat section 82 and opens the opening 821. Meanwhile, when the electromagnetic coil is demagnetized, the movable core 84 is pressed back to the lower end side by the urging force of the valve spring 85, and the lower end thereof (the closing member 843) abuts the opening 821 of the valve seat section 82 and closes the opening 821.

<Mounting Configuration of Pump 60 and Pulsation Reducing Unit 80 on Housing 51>

A description will be made on an example of a configuration at a time when the pump 60 and the pulsation reducing unit 80 are mounted on the housing 51 in the hydraulic control unit 50 for the brake system 1 according to this embodiment.

FIG. 3 is a partial cross-sectional view of an example a state where the pump 60 and the pulsation reducing unit 80 are mounted on the housing 51 in the hydraulic control unit 50 for the brake system 1 according to the embodiment of the present invention. Note that FIG. 3 illustrates an example in which the single pump 60 is provided in the single hydraulic circuit 50. FIG. 3 also illustrates a state where a drive shaft 57 that drives a piston 62 in the pump 60 is detached. Thus, FIG. 3 illustrates the drive shaft 57 and an eccentric section 57*a* formed on the drive shaft 57 by imaginary lines (two-dot chain lines).

As illustrated in FIG. 3, the housing 51 is formed with an accommodation chamber 59 in which the drive shaft 57 that drives the piston 62 of the pump 60 is provided. The accommodation chamber 59 is a bottomed hole that is formed on an outer wall of the housing 51. The housing 51 is also formed with accommodation chambers 53, each of which accommodates the pump 60. Each of these accommodation chambers 53 is a stepped through-hole that penetrates the housing 51 from the outer wall thereof to the accommodation chamber 59.

The pumps 60 accommodated in the accommodation chamber 53 includes a cylinder 61, the piston 62, and the like. The cylinder 61 is formed in a bottomed cylindrical shape that has a bottom section 61b. The cylinder 61 accommodates one end side of the piston 62. A space that is surrounded by an inner circumferential surface of the cylinder 61 and the one end of the piston 62 constitutes a pump chamber 63. This piston 62 freely reciprocates in an axial direction of the cylinder 61. An end 62a as an end on the other end side of the piston 62 protrudes into the accommodation chamber 59. An annular seal member 66 is attached to a portion of the piston 62 that is accommodated in the cylinder 61. This seal member 66 prevents leakage of the brake fluid between an outer circumferential surface of the piston 62 and the inner circumferential surface of the cylinder 61.

In the cylinder 61, a spring 67 is accommodated in a portion between the bottom section 61b and the piston 62, that is, in the pump chamber 63. This spring 67 constantly urges the piston 62 to the accommodation chamber 59 side. In this way, the end 62a of the piston 62 abuts the eccentric section 57a that is formed on the drive shaft 57 in the accommodation chamber 59. A center position of the eccentric section 57a is eccentric with respect to a rotation center of the drive shaft 57. Thus, when the drive shaft 57 is rotated by a drive source, which is not illustrated, the eccentric section 57a is eccentrically rotated with respect to the rotation center of the drive shaft 57. That is, due to the eccentric rotary motion of the eccentric section 57a, the piston 62, the end 62a of which abuts the eccentric section 57a, reciprocates in the axial direction of the cylinder 61.

A portion of the piston 62 that protrudes from the cylinder 61 is slidably guided by a guide member 68 that is provided on an inner circumferential surface of the accommodation chamber 53. In the accommodation chamber 53, an annular seal member 69 is disposed next to the guide member 68 and is attached thereto. This seal member 69 prevents, in a liquid-tight manner, outflow of the brake fluid along the outer circumferential surface of the piston 62.

The piston 62 is axially formed with a bottomed hole 62b that is opened to the pump chamber 63 side of the cylinder 61. The piston 62 is also formed with a suction port 62c that is a through-hole communicating between the outer circumferential surface of the piston 62 and the bottomed hole 62b. The piston 62 is further provided with an inlet valve that is not illustrated and closes an opening of the bottomed hole 62b in a freely openable/closable manner. This inlet valve includes: a ball valve that closes the opening of the bottomed hole 62b; and a spring that urges the ball valve from the cylinder 61 side. A cylindrical filter 70 is attached to an end of the cylinder 61 on the piston 62 side in a manner to cover an opening of the suction port 62c of the piston 62.

In the bottom section 61b of the cylinder 61, a through-hole 61c is formed to communicate between the pump chamber 63 and the outside of the cylinder 61. A discharge valve 64 is provided on an opening side of this through-hole 61c that is on the opposite side from the pump chamber 63. The discharge valve 64 includes: a ball valve 64a; a valve seat 64b that is formed at a circumferential edge of an opening end of the through-hole 61c and allows the ball valve 64a to be seated thereon; and a spring 64c that urges the ball valve 64a in a direction to be seated on the valve seat 64b. This discharge valve 64 is arranged between the cylinder 61 and a cover 65.

In detail, the cover 65 is press-fitted to the bottom section 61b of the cylinder 61, for example. This cover 65 is formed with a bottomed hole 65a that has an opening at a position opposing the through-hole 61c of the bottom section 61b. The spring 64c of the discharge valve 64 is accommodated in the bottomed hole 65a. An inner diameter of the bottomed hole 65a is larger than an outer diameter of the ball valve 64a. Thus, when the ball valve 64a separates from the valve seat 64b, the ball valve 64a moves into the bottomed hole 65a. More specifically, when the hydraulic pressure of the brake fluid in the pump chamber 63 of the cylinder 61 is increased and a force of the brake fluid that presses the ball valve 64a becomes larger than an urging force of the spring 64c, the ball valve 64a separates from the valve seat 64b, and the pump chamber 63 communicates with the bottomed hole 65a of the cover 65 via the through-hole 61c. Then, the brake fluid in the pump chamber 63 flows into the bottomed hole 65a. In the cover 65, a groove that communicates between the outside of the cover 65 and the bottomed hole 65a is formed as a discharge port 65b. The brake fluid that has flowed into the bottomed hole 65a of the cover 65 is discharged from the discharge port 65b to the outside of the cover 65, that is, the outside of the pump 60.

As described above, the thus-configured pump 60 is accommodated in the accommodation chamber 53 that is formed in the housing 51. More specifically, a portion around an opening of the accommodation chamber 53 is caulked in a state where an annular protrusion 61a that is formed in an outer circumferential portion of the cylinder 61 abuts a step section 53a of the accommodation chamber 53. In this way, the pump 60 is fixed in the accommodation chamber 53 of the housing 51.

When the pump 60 is accommodated in the accommodation chamber 53 just as described, a discharge chamber 54 is formed between an outer circumferential surface of the pump 60 and the inner circumferential surface of the accommodation chamber 53, and the discharge chamber 54 is a space that communicates with the discharge port 65b of the pump 60. That is, the discharge chamber 54 is a space that is formed annularly on the outer circumferential side of the pump 60 in a manner to communicate with the discharge port 65b of the pump 60. As will be described below, the discharge chamber 54 constitutes a part of the discharge channel 140.

Meanwhile, in the pump 60, a space between the annular protrusion 61a of the cylinder 61 and the cover 65 is partitioned into two spaces by a partitioning section 71. The space on the cover 65 side from the partitioning section 71 serves as the discharge chamber 54. Meanwhile, the space on the protrusion 61a side from the partitioning section 71 serves as an annular channel 55. Note that, as illustrated in FIG. 3, in this embodiment, the partitioning section 71 is constructed of: a protrusion that protrudes annularly to an outer circumferential surface of the cylinder 61; and an O-ring that is provided in the protrusion. However, any configuration can be adopted for the partitioning section 71 as long as the partitioning section 71 can partition the space between the annular protrusion 61a of the cylinder 61 and the cover 65 into the two spaces. For example, the partitioning section 71 may only be constructed of the protrusion that protrudes annularly to the outer circumferential surface of the cylinder 61. Alternatively, for example, the partitioning section 71 may only be constructed of the O-ring that is provided on the outer circumferential surface of the cylinder 61.

Note that, in this embodiment, when the pump 60 is accommodated in the accommodation chamber 53, an annular channel 56 is formed between the outer circumferential surface of the pump 60 and the inner circumferential surface of the accommodation chamber 53, and the annular channel 56 is a space that communicates with the suction port 62c of the pump 60. That is, the annular channel 56 is a space that is formed annularly on the outer circumferential side of the pump 60 in the manner to communicate with the suction port 62c of the pump 60. The annular channel 56 is formed between the annular protrusion 61a of the cylinder 61 and the seal member 69. In other words, the annular channel 56 is formed on an outer circumferential side of the filter 70, which is provided to cover the opening of the suction port 62c.

The annular channel 56 communicates with the intermediate section 14a of the secondary channel 14 in FIG. 1 by an internal channel that is not illustrated and is formed in the housing 51. In other words, the annular channel 56 constitutes a part of the secondary channel 14. When the pump 60 is accommodated in the accommodation chamber 53, it is necessary to communicate between the suction port 62c of the pump 60 and the intermediate section 14a. Due to provision of the annular channel 56, when the pump 60 is accommodated in the accommodation chamber 53, the pump 60 does not have to be positioned for the communication between the suction port 62c of the pump 60 and the intermediate section 14a. Thus, due to the provision of the annular channel 56, the hydraulic control unit 50 can easily be assembled. In addition, due to the provision of the annular channel 56, when the accommodation chamber 53 is processed in the housing 51, the secondary channel 14 is also partially processed. Thus, it is possible to cut processing cost of the housing 51, that is, manufacturing cost of the hydraulic control unit 50. Furthermore, due to the provision of the annular channel 56, the space on the outer circumferential side of the pump 60 can efficiently be used as the secondary channel 14. Thus, the housing 51, that is, the hydraulic control unit 50 can be downsized.

Next, a description will be made on a configuration of mounting the pulsation reducing unit 80 on the housing 51.

After a lower portion of the pulsation reducing unit 80 is inserted in the bottomed hole provided in the housing 51, the pulsation reducing unit 80 is fixed to the housing 51 in a state where a portion around the fixed bush 87 is caulked by the plastic flow of the housing 51. At this time, a portion above the fixed bush 87 in the pulsation reducing unit 80 is brought into a state of being exposed to the outside from one surface of the housing 51.

The discharge chamber 54, into which the brake fluid pressure-fed by the pump 60 is discharged, is connected to the inflow chamber 88 of the pulsation reducing unit 80 via the discharge channel 140. The opening 821 that is provided in the pulsation reducing unit 80 is connected to the discharge channel 140, and the brake fluid that has flowed out of the inflow chamber 88 flows into the intermediate section 13b of the primary channel 13 via the discharge channel 140.

Note that, in the following description, the discharge channel that connects the discharge chamber 54 of the pump 60 and the inflow chamber 88 will be referred to a first discharge channel 140a, and the discharge channel that connects the opening 821 and the intermediate section 13b will be referred to as a second discharge channel 140b.

Next, a description will be made on the flow of the brake fluid and operation and effects of the pulsation reducing unit 80 with reference to FIG. 3 and FIG. 4.

As illustrated in FIG. 3, in the case where the pump 60 and the pulsation reducing unit 80 are mounted on the housing 51, the brake fluid flows as follows when the pump 60 is driven.

When the drive shaft 57 is rotated by the drive source, which is not illustrated, and the eccentric section 57a formed on the drive shaft 57 moves toward the piston 62, the piston 62 is pressed toward the cylinder 61 side against an urging force of the spring 67. As a result, the pressure in the pump chamber 63 is increased, the ball valve 64a separates from the valve seat 64b, and the discharge valve 64 is opened. Accordingly, the brake fluid in the pump chamber 63 flows through the through-hole 61c and the bottomed hole 65a of the cover 65, and then is discharged from the discharge port 65b to the discharge chamber 54.

When the drive shaft 57 is further rotated and the eccentric section 57a formed on the drive shaft 57 starts being rotated in a direction away from the piston 62, the piston 62 moves in a direction away from the cylinder 61 by the urging force of the spring 67. As a result, the pressure in the pump chamber 63 is reduced, the ball valve 64a is seated on the valve seat 64b, and the discharge valve 64 is closed. In addition, the inlet valve, which is not illustrated and closes the opening of the bottomed hole 62b of the piston 62 in the freely openable/closable manner, is opened. Accordingly, the brake fluid in the annular channel 56 flows into the pump chamber 63 through the filter 70, the suction port 62c, and the bottomed hole 62b.

When the drive shaft 57 is further rotated and the eccentric section 57a, which is formed on the drive shaft 57, moves toward the piston 62 again, the piston 62 is pressed toward the cylinder 61 side as described above, and the brake fluid in the pump chamber 63 is discharged from the discharge port 65b to the discharge chamber 54. Just as described, the piston 62 repeatedly reciprocates in the axial direction of the cylinder 61, and the inlet valve, which is not illustrated, and the discharge valve 64 are selectively opened/closed. In this way, the brake fluid, the hydraulic pressure of which is increased, that is, which is pressurized, is discharged from the discharge port 65b to the discharge chamber 54. Thus, the pulsation is generated in the brake fluid that is pressurized by the pump 60.

At the same time as driving the pump 60, the pulsation reducing unit 80 is driven by the controller 52. More specifically, when the electromagnetic coil (not illustrated) is excited by the controller, the movable core 84 is attracted and moves to the fixed core 83 side against the urging force of the valve spring 85, and separates from the valve seat section 82. In this way, the opening 821, which is formed in the valve seat section 82, is opened. As a result, the brake fluid that is discharged into the discharge chamber 54 flows through the first discharge channel 140a and flows into the inflow chamber 88 of the pulsation reducing unit 80 through an inflow opening 83b of the inflow chamber of the pulsation reducing unit 80.

The brake fluid that has flowed into the inflow chamber 88 is once reserved in the inflow chamber 88, and thereafter flows into the second discharge channel 140b through the opening 821. Since the brake fluid with the pulsation is once reserved in the inflow chamber 88, the inflow chamber 88 itself functions as a damper. Thus, the pulsation of the brake fluid is reduced in the inflow chamber 88. In this way, the brake fluid, the pulsation of which is reduced, thereafter circulates into the primary channel 13 via the second discharge channel 140b.

Here, the movable core 84 of the pulsation reducing unit 80 is structured to be slidable from a first position (see FIG. 4a) that is a position at which the closing member 843 closes the second discharge channel 140b and at which the volume of the inflow chamber 88 is minimized to a second position (see FIG. 4d) that is a position at which the end surface of the movable core 84 on the fixed core 83 side contacts the fixed core 83 and at which the volume of the inflow chamber

88 is maximized. In addition, as illustrated in FIG. 4*b* and FIG. 4*c*, the movable core 84 may be configured such that the movable core 84 can be held in the middle of the stroke thereof. Note that the movable core 84 is more attracted to the fixed core 83 side as a current amount to the coil that is controlled by the controller 52 is increased.

In general, a pulsation reducing effect of the brake fluid is enhanced as the volume of the inflow chamber 88 is increased. However, when the brake fluid is automatically pressurized by the pump, that is, during the active pressure build-up, the brake fluid that has flowed into the inflow chamber 88 does not contribute to the increase in the hydraulic pressure of the wheel cylinder 12. Thus, a braking force is weakened.

This becomes problematic particularly when braking control for urgently stopping the vehicle is executed by using an active pressure build-up function in order to avoid an imminent collision. In such an urgent time, an increase in a brake hydraulic pressure of the wheel cylinder 12 should be prioritized over the reduction in the pulsation of the brake fluid.

Accordingly, in the case where the vehicle is in an urgent brake mode, in order to reduce loss of a brake hydraulic pressure, the movable core 84 is preferably lifted just enough to allow the outflow of the brake fluid into the second discharge channel 140*b* (see FIG. 4*b*). This is achieved when the controller 52 appropriately controls the current applied to the coil, so as to cause the closing member 843 to separate from the opening 821 and the movable core 84 to be kept at a position near the first position.

As another embodiment, for example, in the case where the brake hydraulic pressure to the wheel cylinder is increased by the active pressure build-up, the volume of the inflow chamber 88 may vary according to a target hydraulic pressure requested for the wheel cylinder. More specifically, the current flowing through the coil may be controlled such that the volume of the inflow chamber 88 is reduced as the brake hydraulic pressure requested for the wheel cylinder is increased and that the volume of the inflow chamber 88 is increased as the brake hydraulic pressure requested for the wheel cylinder is reduced. Such control can be executed by storing a relationship between the target hydraulic pressure to the wheel cylinder and the current amount applied to the coil by the controller 52 during the active pressure build-up in memory of the controller 52 in advance.

<Effects of Hydraulic Control Unit 50>

A description will be made on the effects of the pulsation reducing unit 80 and the hydraulic control unit 50 according to this embodiment.

Since the volume of the inflow chamber, into which the brake fluid with the pulsation flows, can vary, it is possible with the pulsation reducing unit 80 to realize the brake system capable of adjusting the braking force to be exerted on the vehicle and a pulsation reducing degree of the brake fluid with the pulsation according to a braking mode of the vehicle.

The pulsation reducing unit 80 is structured that the valve spring 85 is mounted on the cavity section 841 of the movable core 84 and that the pressing section 86 enters the cavity section 841 and presses the valve spring 85. Thus, it is possible to provide the large volume of the inflow chamber, into which the brake fluid flows.

Since the controller simultaneously drives the pump and the pulsation reducing unit, the brake fluid with the pulsation can flow in the state where the position of the movable core is controlled and where the inflow chamber is set to have the appropriate volume in advance. Therefore, the pulsation of the brake fluid can effectively be reduced.

Since the pulsation reducing unit 80 can keep the movable core at any position, it is possible to balance between the braking force to be exerted on the vehicle and the pulsation reducing degree of the brake fluid with the pulsation according to the braking mode of the vehicle and the target hydraulic pressure during the active pressure build-up that is set for the wheel cylinder.

REFERENCE SIGNS LIST

1: Brake system
2: Hydraulic circuit
2*a*: Hydraulic circuit
2*b*: Hydraulic circuit
11: Master cylinder
12: Wheel cylinder
13: Primary channel
13*a*, 13*b*: Intermediate section
14: Secondary channel
14*a*: Intermediate section
15: Supply channel
16: Brake pedal
17: Booster
18: Brake caliper
19: Brake pad
20: Rotor
31: Inlet valve
32: Outlet valve
33: Accumulator
35: First switching valve
36: Second switching valve
37: Damper unit
50: Hydraulic control unit
51: Housing
52: Controller
53: Accommodation chamber
53*a*: Step section
54: Discharge chamber
55: Annular channel
56: Annular channel
57: Drive shaft
57*a*: Eccentric section
59: Accommodation chamber
60: Pump
61: Cylinder
61*a*: Protrusion
61*b*: Bottom section
61*c*: Through-hole
62: Piston
62*a*: End
62*b*: Bottomed hole
62*c*: Suction port
63: Pump chamber
64: Discharge valve
64*a*: Ball valve
64*b*: Valve seat
64*c*: Spring
65: Cover
65*a*: Bottomed hole
65*b*: Outlet
66: Seal member
67: Spring
68: Guide member
69: Seal member
70: Filter 71: Partitioning section
80: Pulsation reducing unit
81: Valve housing
82: Valve seat section
83: Fixed core
84: Movable core
85: Valve spring
86: Pressing section
87: Fixed bush
88: Inflow chamber
100: Vehicle
140: Discharge channel
142: Suction channel

The invention claimed is:

1. A hydraulic control unit (50) for a vehicle brake system (1), the hydraulic control unit (50) comprising:
a discharge channel (140) from which a brake fluid is discharged, the brake fluid being pressurized by a pump (60);
a pulsation reducing unit (80) that is disposed in the middle of the discharge channel (140); and
a controller (52) that controls the pump (60) and the pulsation reducing unit (80), wherein
the pulsation reducing unit (80) includes:
a valve housing (81);
a fixed core (83) that is fixed to the valve housing (81);
a movable core (84) that is received in the valve housing (81) in an axially movable manner;
a closing member (843) protruding in a first direction perpendicularly from a first end surface of the movable core (84) that closes the discharge channel (140);
a coil that is disposed in a manner to surround the valve housing (81) and the fixed core (83); and
an inflow chamber (88) that is formed by the valve housing (81) and the first end surface of the movable core (83), into which the brake fluid from the discharge channel (140) flows, and whose volume can vary.

2. The hydraulic control unit according to claim 1, wherein
the pulsation reducing unit (80) includes:
a valve spring (85) that is mounted on a cavity section (841) of the movable core (84) and urges the movable core (84) in a direction to minimize the volume of the inflow chamber (88); and
a pressing section (86) that is mounted on the fixed core (83), enters the cavity section, and presses the valve spring (85).

3. The hydraulic control unit according to claim 1, wherein the controller (52) drives the pulsation reducing unit (80) at the same time as the pump (60).

4. The hydraulic control unit according to claim 1, wherein
the movable core (84) is configured to move from a first position at which the closing member (843) closes the discharge channel (140) and at which the volume of the inflow chamber (88) is minimized to a second position at which a second end surface of the movable core (84) on the fixed core (83) side contacts the fixed core (83) and at which the volume of the inflow chamber (88) is maximized, and
the controller (52) controls a current flowing through the coil such that the movable core (84) is kept at any position between the first position and the second position.

5. The hydraulic control unit according claim 1, wherein
the brake system has an active pressure build-up function to actuate the pump (60) and automatically pressurize a hydraulic pressure of a wheel cylinder in the vehicle, and
the controller (52) controls the current flowing through the coil according to a target hydraulic pressure to the wheel cylinder that is set by the active pressure build-up function.

6. A hydraulic control unit (50) for a vehicle brake system (1), the hydraulic control unit (50) comprising:
a discharge channel (140) from which a brake fluid is discharged, the brake fluid being pressurized by a pump (60);
a pulsation reducing unit (80) that is disposed in the middle of the discharge channel (140); and
a controller (52) that controls the pump (60) and the pulsation reducing unit (80), wherein the pulsation reducing unit (80) includes:
a valve housing (81);
a fixed core (83) that is fixed to the valve housing (81);
a movable core (84) that is received in the valve housing (81) in an axially movable manner;
a closing member (843) protruding in a first direction perpendicularly from a first end surface of the movable core (84) that closes the discharge channel (140);
a coil that is disposed in a manner to surround the valve housing (81) and the fixed core (83); and
an inflow chamber (88) that is formed by the valve housing (81) and the first end surface of the movable core (83), into which the brake fluid from the discharge channel (140) flows, and whose volume can vary, wherein
the movable core (84) is configured to move from a first position at which the closing member (843) closes the discharge channel (140) and at which the volume of the inflow chamber (88) is minimized to a second position at which a second end surface of the movable core (84) on the fixed core (83) side contacts the fixed core (83) and at which the volume of the inflow chamber (88) is maximized, and
the controller (52) controls a current flowing through the coil such that the movable core (84) is kept at any position between the first position and the second position.

7. A hydraulic control unit (50) for a vehicle brake system (1) comprising:
a discharge channel (140) from which a brake fluid is discharged, a brake fluid being pressurized by a pump (60);
a pulsation reducing unit (80) that is disposed in the middle of the discharge channel (140); and
a controller (52) that controls the pump (60) and the pulsation reducing unit (80), wherein
the pulsation reducing unit (80) includes:
a valve housing (81);
a fixed core (83) that is fixed to the valve housing (81);
a movable core (84) that is received in the valve housing (81) in an axially movable manner;
a closing member (843) protruding in a first direction perpendicularly from a first end surface of the movable core (84) that closes the discharge channel (140);
a coil that is disposed in a manner to surround the valve housing (81) and the fixed core (83); and
an inflow chamber (88) that is formed by the valve housing (81) and the first end surface of the movable core (83), into which the brake fluid from the discharge channel (140) flows, and whose volume can vary, wherein the controller (52) drives the pulsation reducing unit (80) to move the moveable core to open the discharge channel (140) at the same time as the controller (52) drives the pump (60).

\* \* \* \* \*